United States Patent Office 3,642,727
Patented Feb. 15, 1972

3,642,727
VULCANISATION PROCESS
Brian Thomas Ashworth, Donald Harper, and Peter Hill, Manchester, England, assignors to Imperial Chemical Industries Limited, London, England
No Drawing. Filed July 11, 1969, Ser. No. 841,109
Claims priority, application Great Britain, July 19, 1968, 34,539/68
Int. Cl. C08f 27/06
U.S. Cl. 260—79.5 A    12 Claims

ABSTRACT OF THE DISCLOSURE

Vulcanised rubbers having improved resistance to heat are obtained by heating unvulcanised rubber with bis(dihydrocarbylthiophosphoryl) tri- or tetra-sulphides, preferably in presence of elemental sulphur and a conventional sulphur-curing accelerator.

---

This invention relates to a vulcanisation process for rubbers, and more particularly to the use of bis(thiophosphoryl) polysulphides as sulphur donors in vulcanisation.

Improvement in the resistance to heat degradation of vulcanised rubbers may be obtained by using vulcanisation systems consisting of, for example, sulphenamides such as benzthiazylsulphenamides in amounts greater than is used in normal vulcanising processes in conjunction with reduced amounts of sulphur. Such a system however has a slow rate of cure and gives vulcanisates which tend to become discoloured and to stain. Alternatively there may be used for example tetramethylthiuram disulphide in the absence of sulphur but this gives a rubber compound which is liable to scorch or premature vulcanisation and has a tendency to bloom. It has been found that rubbers comparatively resistant to degradation by heat but free from the above disadvantages are obtained by using as a replacement for all or part of the sulphur a bis(thiophosphoryl) polysulphide.

According to the invention there is provided a process for the vulcanisation of rubber which comprises mixing the vulcanised rubber with bis(dihydrocarbylthiophosphoryl)tri- or tetrasulphide and heating to a vulcanising temperature.

As rubbers there may be mentioned natural rubber and synthetic rubber for example cis-polyisoprene, cis-polybutadiene, butadiene/styrene copolymers, butadiene/acrylonitrile copolymers, butadiene/methyl methacrylate copolymers, polymers and copolymers of isobutene and the other well-known types of sulphur vulcanisable synthetic rubbers. The process of the invention is of particular value with the natural rubber or cis-polyisoprene.

The thiophosphorylpolysulphide may be mixed with the unvulcanised rubber by any conventional process, for example, on a two roll rubber mixing mill or in an internal mixer.

As hydrocarbyl groups there are mentioned especially alkyl, cycloalkyl and aryl groups. It is preferred that both hydrocarbyl groups in the bis(dihydrocarbylthiophosphoryl)polysulphide are of similar type and, particularly, are the same.

As alkyl groups which may be present in the polysulphide there may be mentioned any primary, secondary or tertiary alkyl group, but preferably alkyl groups containing from 1 to 9 carbon atoms. The preferred polysulphide is bis(diethylthiophosphoryl) trisulphide.

As cycloalkyl groups which may be present in the polysulphide there may be mentioned the cyclohexyl group.

As aryl groups which may be present in the polysulphide there may be mentioned phenyl, p-tolyl, o-tolyl and m-tolyl.

When used in absence of elemental sulphur or additional accelerator the polysulphide should be used in amount between 1 and 10%, and preferably between 2 and 5%, of the weight of rubber.

Although some loss of heat resistance may take place it is sometimes desirable in order to maintain physical properties such as flex resistance at a high level to carry out the process of the invention in presence of elemental sulphur. While the amounts of polysulphide and sulphur to be used will vary depending upon the presence of other accelerators and the balance of physical properties required in the vulcanised rubber the sulphur and polysulphide should be regarded as replacements for each other, one part of polysulphide being approximately equivalent to 2 parts of sulphur in vulcanisations in which the amount of sulphur and polysulphide are not greatly different. For example the use of 1.5 parts of sulphur and 0.5 part of polysulphide is approximately equivalent to the use of 0.5 part of sulphur and 1.0 part of polysulphide in 100 parts of natural rubber using a sulphenamide accelerator in addition. At lower usages of sulphur the amount of polysulphide should however be increased disproportionately. In general as the usage of sulphur is increased the improvement in heat resistance decreases.

In order to obtain the maximum resistance to degradation by heat it is preferred to add a conventional accelerator of sulphur vulcanisation also to the unvulcanised rubber before vulcanisation.

As such conventional accelerators there may be mentioned especially sulphur-containing accelerators or mixtures of such accelerators such as thiazoles, for example mercaptobenzthiazole, dibenzthiazyl disulphide, and the zinc salt of mercaptobenzthiazole, sulphenamides, for example, cyclohexylbenzthiazylsulphenamide, N - oxydiethylene benzthiazyl sulphenamide and dicyclohexyl benzthiazyl sulphenamide, thiurams, for example tetramethylthiuram disulphide, tetramethylthiuram monosulphide and tetraethylthiuram disulphide, and dithiacarbamates; for example, zinc diethyldithiocarbamate.

The unvulcanised rubbers may also contain other conventional adjuvants, for example zinc oxides, furnace and carbon blacks, antioxidants, antiozonants, peptisers, softeners, blowing agents, and pigments.

The total conventional accelerator should be used in amounts up to 6%, and preferably from 0.5% and especially from 1% to 3%, of the weight of rubber.

When a conventional accelerator is used the preferred usage of thiophosphoryl polysuldphide is between 0.5% and especially 1% and 3% of the weight of rubber.

Heating to vulcanise the rubber may be carried out at any convenient temperature between 100 and 200° C., but preferably between 140 and 180° C. for times which are conventional in the art, for example from 30 to 2 minutes.

The invention is illustrated but not limited by the following Examples in which all parts and percentages are by weight unless otherwise stated.

EXAMPLE 1

Rubber mixes of the following composition are compounded on a rubber mixing mill, and vulcanised at 150° C. The vulcanised rubbers are aged in a multi-cell air oven at 100° C. and the tensile strength and elongation at break of the aged rubbers determined.

| Parts: | | | |
|---|---|---|---|
| Pale crepe | 100 | 100 | 100 |
| Zinc oxide | 10 | 10 | 10 |
| Stearic acid | 1 | 1 | 1 |
| Blanc fixe | 75 | 75 | 75 |
| Tetramethylthiuram disulphide | 4 | 1 | |
| Cyclohexylbenzthiazyl sulphenamide | | | 2 |
| Dibenzthiazyl disulphide | | 1 | |
| Bis(diethylthiophosphoryl)trisulphide | | | 2 |
| Mooney scorch at 130° C. (mins. to min. +10) | 5 | 7½ | 11 |
| Cure at 150° C. (minutes) | 20 | 20 | 20 |
| Tensile strength (kg./cm.²) | 232 | 241 | 258 |
| Elongation at break (percent) | 595 | 675 | 700 |
| Oven ageing at 100° C.: | | | |
| 4 days: | | | |
| Tensile strength (kg./cm.²) | 122 | 189 | 206 |
| Percent retained | 53 | 78 | 80 |
| Elongation (percent) | 555 | 590 | 575 |
| Percent retained | 93 | 88 | 82 |
| 6 days: | | | |
| Tensile strength (kg./cm.²) | 108 | 175 | 177 |
| Percent retained | 47 | 73 | 69 |
| Elongation (percent) | 540 | 585 | 555 |
| Percent retained | 91 | 87 | 79 |

EXAMPLE 2

Rubber mixes of the following compositions are compounded on a rubber mixing mill and vulcanised at 130° C. The vulcanised rubbers are aged in an air oven at 100° C. and the change in tensile strength determined.

| Mix No | 1 | 2 | 3 | 4 | 5 |
|---|---|---|---|---|---|
| Pale crepe natural rubber | 100 | 100 | 100 | 100 | 100 |
| Zinc oxide | 10 | 10 | 10 | 10 | 10 |
| Stearic acid | 1 | 1 | 1 | 1 | 1 |
| Blanc fixe | 75 | 75 | 75 | 75 | 75 |
| Tetramethylthiuram disulphide | | 3.0 | | | |
| Cyclohexylbenzthiazyl sulphenamide | 1.0 | | 4.0 | | 2.0 |
| Bis(diethylthiophosphoryl)trisulphide | | | | 3.0 | 2.0 |
| Sulphur | 2.5 | | 0.5 | | |
| Mooney Scorch at 130° C. (mins. to minimum +10 value) | 19.5 | 5 | 28 | 9 | 11 |
| Press cure at 150° C | 20 | 20 | 35 | 20 | 20 |
| Tensile strength (kg./cm.²) | 225 | 193 | 177 | 221 | 235 |
| Elongation at break (percent) | 650 | 730 | 670 | 680 | 720 |
| Modulus at 300% elong. (kg./cm.²) | 27 | 22 | 24 | 32 | 26 |
| Oven ageing at 100° C., percent retained tensile strength, aged at— | | | | | |
| 4 days | 10 | 82 | 97 | 57 | 83 |
| 6 days | (¹) | 77 | 87 | 49 | 74 |
| 8 days | | 62 | 77 | 14 | 63 |
| 10 days | | 59 | 57 | (¹) | 55 |

¹ Perished.

The above results show the improved retention of tensile strength on ageing of the two mixes containing bis-(diethylthiophosphoryl)trisulphide, Mixes 4 and especially 5, over the conventional Mix 1. Mixes 4 and 5 are superior to Mix 2 (tetramethylthiuram disulphide) in lower tendency to scorch.

After vulcanisation the mixes based on cyclohexylbenzthiazylsulphenamide, especially Mix 3, were discoloured brown. Mix 4, based solely on bis(diethylthiophosphoryl)trisulphide is essentially colourless after vulcanisation. Exposure of Mix 3 to sunlight under glass for 2 weeks produces a deepening of the colour. Similar treatment of Mix 4 does not cause any discolouration.

Mixes 3 and 4 are placed in contact with a white plasticised polyvinyl chloride compound and exposed to U.V. light for 10 hours. A yellow migration stain is imparted to the polyvinyl chloride in contact with Mix 3 but not with that in contact with Mix 4.

EXAMPLE 3

The mixes given in the table below are prepared by mixing the rubber, carbon black, zinc oxide, stearic acid and process oil in a laboratory scale internal mixer. The sulphur or sulphur donor together with the accelerator are then added to the masterbatch prepared in the above manner on a laboratory two roll mill.

The compounds are vulcanised at 150° C. for the times quoted in a compression mould to give sheets of 2 mm. thickness.

| Mix No | 1 | 2 | 3 | 4 |
|---|---|---|---|---|
| Smoked sheet natural rubber | 100 | 100 | 100 | 100 |
| Zinc oxide | 3.5 | 3.5 | 3.5 | 3.5 |
| Stearic acid | 3 | 3 | 3 | 3 |
| H.A.F. carbon black | 45 | 45 | 45 | 45 |
| Process oil | 3.5 | 3.5 | 3.5 | 3.5 |
| Tetramethylthiuram disulphide | | 3.0 | | |
| Cyclohexylbenzthiazyl sulphenamide | 1.0 | | | 2 |
| Bis(diethylthiophosphoryl)trisulphide | | | 3 | 2 |
| Sulphur | 2.5 | | | |
| Cure time at 250° C. (mins.) | 15 | 15 | 15 | 15 |

The sheets prepared in the above manner are stored at room temperature and examined periodically for signs of bloom. After 6 months storage the mix based on tetramethylthiuram disulphide (Mix 2) has developed a heavy surface bloom. No sign of bloom can be detected with those mixes based on bis(diethylthiophosphoryl)trisulphide (Mixes 3 and 4) or on the mix vulcanised with cyclohexylbenzthiazyl sulphenamide and sulphur.

EXAMPLE 4

Rubber mixes are compounded on a rubber mixing mill, vulcanised at 150° C., and aged in an air oven at 100° C. The change in tensile strengths of the vulcanisates is determined.

| Mix No | 1 | 2 | 3 |
|---|---|---|---|
| Smoked sheet | 100 | 100 | 100 |
| Zinc oxide | 3.5 | 3.5 | 3.5 |
| Stearic | 3 | 3 | 3 |
| H.A.F. carbon black | 45 | 45 | 45 |
| Process oil | 3.5 | 3.5 | 3.5 |
| Cyclohexylbenzthiazylsulphenamide | 1.0 | 1.0 | 1.0 |
| Bis(diethylthiophosphoryl)trisulphide | | 0.5 | 1.0 |
| Sulphur | 2.5 | 1.5 | 0.5 |
| Press cure at 150° C. (mins.) | 15 | 10 | 15 |
| Tensile strength (kg./cm.²) | 287 | 288 | 283 |
| Elongation at break (percent) | 495 | 520 | 565 |
| Modulus at 300% elongation. (kg./cm.²) | 158 | 153 | 121 |
| Hardness, BS° | 71 | 67 | 61 |
| Resilience at 50° C | 71 | 74 | 70 |
| Oven ageing at 100° C., percent retained tensile strength, aged at— | | | |
| 1 day | 71 | 79 | 95 |
| 3 days | 45 | 63 | 77 |
| 6 days | 17 | 38 | 51 |

EXAMPLE 5

Rubber mixes are compounded and vulcanised as described in Example 4 and the tensile strength of the vulcanisates determined before and after ageing for 3 days in an air oven at 100° C.

| Mix No | 1 | 2 | 3 | 4 | 5 | 6 |
|---|---|---|---|---|---|---|
| Pale crepe | 100 | 100 | 100 | 100 | 100 | 100 |
| Zinc oxide | 10 | 10 | 10 | 10 | 10 | 10 |
| Blanc fixe | 75 | 75 | 75 | 75 | 75 | 75 |
| Stearic acid | 1 | 1 | 1 | 1 | 1 | 1 |
| Cyclohexylbenzthiazyl sulphenamide | 2 | 2 | 2 | 2 | 2 | 2 |
| Bis(diethylthiophosphoryl)trisulphide | 2 | | | | | |
| Bis(dinonylthiophosphoryl)trisulphide | | 2 | | | | |
| Bis(dinonylthiophosphoryl)tetrasulphide | | | 2 | | | |
| Bis(diphenylthiophosphoryl)trisulphide | | | | 2 | | |
| Bis(dicyclohexylthiophosphoryl)trisulphide | | | | | 2 | |
| Bis(dicyclohexylthiophosphoryl)tetrasulphide | | | | | | 2 |
| Mooney scorch at 120° C. (mins. to minimum +10 value) | 23 | 53 | 38 | 11 | 36 | 34 |
| Optimum cure 150° C. (mins.) | 20 | 40 | 30 | 15 | 30 | 30 |
| Tensile strength (kg./cm.²) | 208 | 138 | 187 | 133 | 139 | 167 |
| Elongation at break (percent) | 655 | 730 | 740 | 725 | 715 | 750 |
| Modulus at 300% elongation (kg./cm.²) | 30 | 11 | 19 | 17 | 17 | 19 |
| Oven ageing at 100° C., percent retained tensile strength, aged 3 days | 78 | 85 | 80 | 98 | 72 | 68 |

EXAMPLE 6

Rubber mixes are compounded in a rubber mixing mill vulcanised at 150° C. and the tensile strength determined before and after ageing in an air oven at 100° C.

| Mix No | 1 | 2 | 3 | 4 | 5 | 6 |
| --- | --- | --- | --- | --- | --- | --- |
| Smoke sheet | 100 | 100 | 100 | 100 | 100 | 100 |
| Zinc oxide | 3.5 | 3.5 | 3.5 | 3.5 | 3.5 | 3.5 |
| Stearic acid | 3 | 3 | 3 | 3 | 3 | 3 |
| H.A.F. carbon black | 45 | 45 | 45 | 45 | 45 | 45 |
| Process oil | 3.5 | 3.5 | 3.5 | 3.5 | 3.5 | 3.5 |
| Bis(diethylthiophosphoryl) trisulphide | 2 | 2 | 2 | 2 | 2 | 2 |
| Cyclohexylbenzthiazylsulphenamide | 2 | | | | | |
| 2-(4-morpholinyl thio)benzthiazole | | 2 | | | | |
| Dibenzthiazyl disulphide | | | 2 | | | |
| Tetramethylthiuram monosulphide | | | | 2 | | |
| Tetramethylthiuram disulphide | | | | | 2 | |
| Zinc diethyldithiocarbamate | | | | | | 2 |
| Mooney scorch at 120° C. (time to min. +10 value) mins | 19 | 37 | 22 | 12 | 6 | 3 |
| Pressure cure at 150° C | 15 | 20 | 25 | 15 | 15 | 10 |
| Tensile strength (kg./cm.²) | 264 | 283 | 263 | 260 | 259 | 269 |
| Elongation at break (percent) | 520 | 525 | 510 | 525 | 430 | 480 |
| Modulus at 300% (kg./cm.²) | 122 | 139 | 132 | 119 | 169 | 51 |
| Oven ageing at 100° C., percent retained tensile strength, aged at— | | | | | | |
| 6 days | 75 | 65 | 67 | 71 | 68 | 62 |
| 8 days | 52 | 48 | 54 | 52 | 44 | 49 |
| 12 days | 32 | 24 | 32 | 23 | 19 | 2 |

We claim:

1. A process for the vulcanisation of rubber consisting essentially of mixing the unvulcanised rubber with a bis-(dihydrocarbylthiophosphoryl) tri- or tetra-sulphide wherein the hydrocarbyl moiety is selected from the group consisting of alkyl having 1–9 carbon atoms, cyclohexyl, phenyl and tolyl and heating to a vulcanising temperature.

2. A process as claimed in claim 1 wherein the bis(dihydrocarbylthiophosphoryl) tri- or tetra-sulphide is bis-(diethylthiophosphoryl) trisulphide.

3. A process as claimed in claim 1 wherein the bis(dihydrocarbylthiophosphoryl) tri- or tetra-sulphide is used in amount between 1 and 10% of the weight of rubber.

4. A process as claimed in claim 1 wherein the bis(dihydrocarbylthiophosphoryl) tri- or tetra-sulphide is used in amount between 2 and 5% of the rubber.

5. A process as claimed in claim 3 wherein a part of the bis(dihydrocarbylthiophosphoryl)tri- or tetrasulphide is replaced by elemental sulphur.

6. A process as claimed in claim 1 wherein there is used in addition a conventional sulfur-containing accelerator.

7. A process as claimed in claim 6 wherein said conventional sulfur-containing accelerator is selected from the group consisting of thiazoles, sulphenamides, thiurams, and dithiocarbamates.

8. A process as claimed in claim 6 wherein said conventional sulfur-containing accelerator is selected from the group consisting of mercaptobenzthiazole, dibenzyl thiazyl disulphide, the zinc salt of mercaptobenzthiazole, cyclohexylbenzthiazylsulphenamide, N-oxydiethylene benzthiazyl sulphenamide, dicyclohexyl benzthiazyl sulphenamide, tetramethylthiuramdisulphide, tetramethylthiuram monosulphide, tetramethylthiuram disulphide and zinc diethyldithiocarbamate.

9. A process as claimed in claim 6 wherein said conventional sulfur-containing accelerator is used in amounts of 0.5–6% of the weight of the rubber.

10. A process as claimed in claim 9 wherein said conventional sulfur-containing accelerator is used in amounts of 1–3% of the weight of the rubber.

11. A process as claimed in claim 6 wherein said bis-(dihydrocarbylthiophosphoryl) tri- or tetra-sulphide is used in amounts of 0.5–3% of the weight of the rubber.

12. A process as claimed in claim 11 wherein said bis-(dihydrocarbylthiophosphoryl) tri- or tetra-sulphide is used in amounts of 1–3% of the weight of the rubber.

References Cited

UNITED STATES PATENTS 3,419,521  12/1968  Scott _____ 260—41.5
3,427,292  2/1969  Godfrey _____ 260—79

JOSEPH L. SCHOFER, Primary Examiner

C. A. HENDERSON, JR., Assistant Examiner

U.S. Cl. X.R.

260—79.5 B, 79.5 C, 783, 785, 786, 793